United States Patent
Ito et al.

(10) Patent No.: US 8,739,633 B2
(45) Date of Patent: Jun. 3, 2014

(54) UNDERWATER WORK DEVICE AND UNDERWATER STRAIN GAUGE DEVICE

(75) Inventors: Hisao Ito, Yokosuka (JP); Eiichiro Araki, Yokosuka (JP); Kazuo Furuya, Tokyo (JP)

(73) Assignee: Japan Agency for Marine-Earth Science and Technology, Yokosuka-shi, Kanagawa (JP)

( * ) Notice: Subject to any disclaimer, the term of this patent is extended or adjusted under 35 U.S.C. 154(b) by 47 days.

(21) Appl. No.: 13/518,597

(22) PCT Filed: Dec. 24, 2010

(86) PCT No.: PCT/JP2010/073431
§ 371 (c)(1),
(2), (4) Date: Sep. 10, 2012

(87) PCT Pub. No.: WO2011/078362
PCT Pub. Date: Jun. 30, 2011

(65) Prior Publication Data
US 2013/0008257 A1    Jan. 10, 2013

(30) Foreign Application Priority Data
Dec. 25, 2009 (JP) ................................ 2009-295348

(51) Int. Cl.
*G01B 5/00* (2006.01)
(52) U.S. Cl.
USPC .......................................................... 73/784
(58) Field of Classification Search
CPC ...................................................... G01B 13/24
See application file for complete search history.

(56) References Cited

U.S. PATENT DOCUMENTS

| | | | |
|---|---|---|---|
| 2,957,341 A | 10/1960 | Menard | |
| 3,187,560 A | 6/1965 | Bailey | |
| 5,900,545 A | 5/1999 | Sacks et al. | |
| 2006/0137442 A1 | 6/2006 | Kamata | |

FOREIGN PATENT DOCUMENTS

| | | |
|---|---|---|
| JP | 57-165710 | 10/1982 |
| JP | 60-205206 | 10/1985 |
| JP | 61-174613 | 10/1986 |
| JP | 2-189434 | 7/1990 |
| JP | 11-51566 | 10/1999 |
| JP | 11-512828 | 11/1999 |
| JP | 2003-42864 | 2/2003 |
| JP | 2008-525814 | 7/2008 |

*Primary Examiner* — Lisa Caputo
*Assistant Examiner* — Brandi N Hopkins
(74) *Attorney, Agent, or Firm* — Drinker Biddle & Reath LLP

(57) ABSTRACT

To easily change internal pressure of a container according to a change in external pressure.
In a strain gauge device 100, a piston 54 attached to a tubular opening portion 53A provided at a housing part 53 slides in response to external pressure. Thereby varying the volumes of a regulator oil containing region 52 and a sensitive region 15 so as to achieve a balance with the external pressure, to change the internal pressure. Then, in the above-described strain gauge device, because the internal pressures of the regulator oil containing region 52 and the sensitive region 15 are changed according to a change in external pressure only by sliding of the piston 54, it is possible to easily perform regulation of the internal pressure. Further, because the above-described pressure balance mechanism 51 is achieved with a simple configuration, it is possible to easily perform regulation of the external pressure and the internal pressure even in a high-temperature/high-pressure environment.

19 Claims, 10 Drawing Sheets

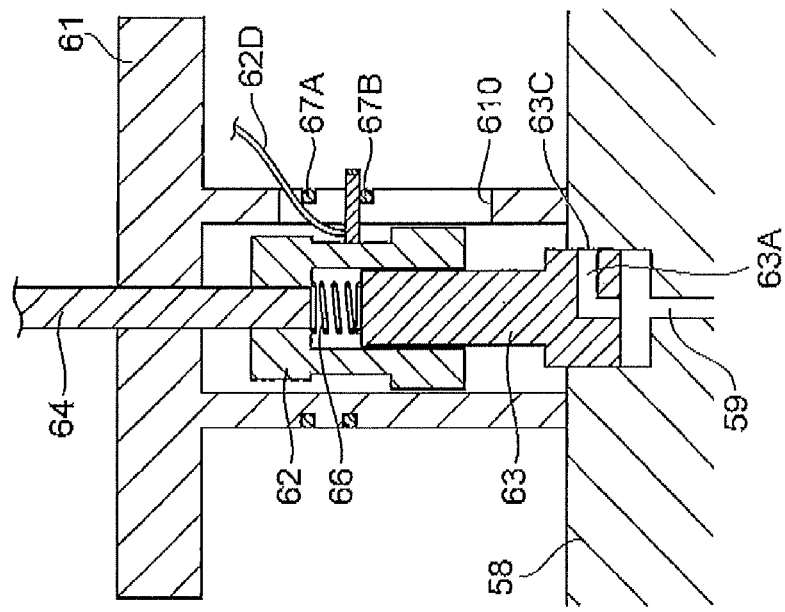
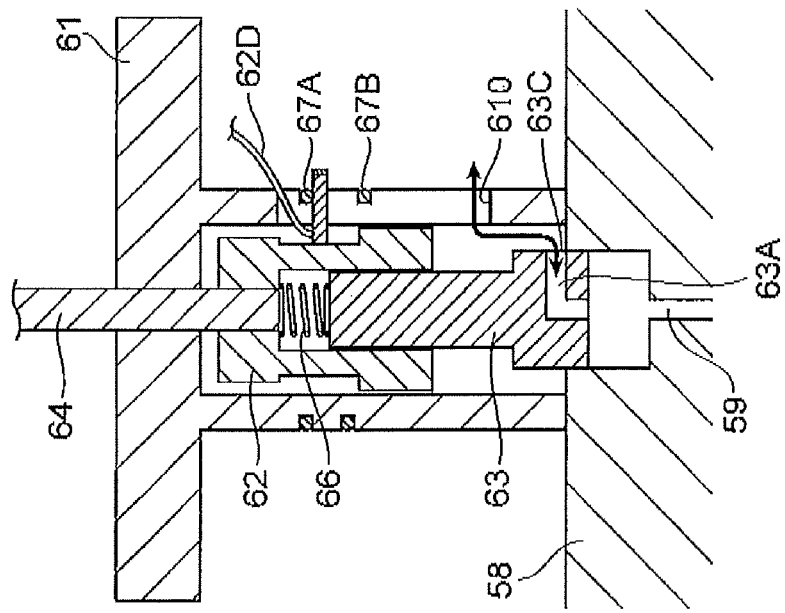
Fig. 9

UNDERWATER WORK DEVICE AND UNDERWATER STRAIN GAUGE DEVICE

TECHNICAL FIELD

The present invention relates to an underwater work device and an underwater strain gauge device.

BACKGROUND ART

Conventionally, crustal movement observation by gauging ground strain or the like has been performed for the purpose of prediction of earthquakes or the like. As a method of gauging ground strain, for example, as a strain sensor disclosed in Patent Document 1, a method in which a sensor whose inside is filled with fluid is inserted into a hole provided on land, to sense a change in the volume in the hole due to a change in the shape of the hole by the inside fluid has been known. Moreover, in recent years, it is considered that a change in stress in the crust is understood in more detail by, not only gauging strain on land, but also gauging strain at the bottom of water such as the ocean floor.

CITATION LIST

Patent Literature

Patent Document 1: Japanese Unexamined Patent Application Publication (Translation of PCT Application) No. 11-512828

SUMMARY OF INVENTION

Technical Problem

However, the strain sensor disclosed in Patent Document 1 is a device for the purpose of gauging in a hole provided on land, and in the case where this strain sensor is used in a high-pressure environment such as gauging at the bottom of water, a difference between the external pressure by the water pressure and the internal pressure of the sensor is increased, which may break the strain sensor. Accordingly, it is required for the device used underwater to adjust the internal pressure of the container according to external pressure.

The present invention has been achieved in consideration of the above description, and an object of the present invention is to provide an underwater work device and an underwater strain gauge device which are capable of easily changing internal pressure of the container according to a change in external pressure.

Solution to Problem

In order to achieve the above-described object, an underwater work device according to the one aspects of the present invention is an underwater work device which is used for work underwater, that includes a container in which fluid is contained inside, an outer tube part which composes a part of the container, and has a tubular opening portion communicated with the outside, and a piston which is provided so as to block the opening portion inside the outer tube part, and is slidable in response to external, pressure.

According to the above-described underwater work device, the piston attached to the tubular opening portion in the outer tube part slides in response to external pressure. Thereby varying the volume of the inside of the container so as to achieve a balance with the external pressure, to change the internal pressure of the container. Then, because the internal pressure of the container is changed according to a change in external pressure only by sliding of the piston, it is possible to easily perform regulation of the internal pressure.

As a configuration for effectively exerting the above-described effect, an underwater strain gauge device can be cited. In detail, an underwater strain gauge device according to the present invention includes a container in which fluid is contained inside, an outer tube part which composes a part of the container, and has a tubular opening portion communicated with the outside, a piston which is provided so as to block the opening portion inside the outer tube part, and is slidable in response to external pressure, and a gauging unit that gauges internal pressure of the container, in which the container is composed of a sensitive section formed of a member deformable according to external pressure, and a volume of the inside of the container fluctuates by a deformation of the sensitive section.

In the above-described underwater strain gauge device, the piston attached to the tubular opening portion in the outer tube part slides in response to external pressure, thereby varying the volume of the inside of the container, to change the internal pressure of the container. In this way, the internal pressure of the container is changed according to a change in external pressure only by sliding of the piston, to be able to reduce a difference between the external pressure and the internal pressure. Therefore, in the above-described underwater strain gauge device, it is possible to include the sensitive section formed of a member deformable according to external pressure as a part of the container, which makes it possible to gauge a change in pressure by a deformation of the sensitive section even in a high-pressure environment such as underwater.

Here, the above-described underwater strain gauge device may be in a mode in which a displacement gauge that senses a displacement of the sensitive section is further included.

As described above, because the displacement gauge that senses a displacement of the sensitive section is further included, it is possible to gauge a displacement which is difficult to be sensed by a change in internal pressure of the container, which makes it possible to more accurately gauge strain.

Moreover, it is preferable that a plurality of the displacement gauges are provided along the sensitive section.

According to a mode in which a plurality of the displacement gauges are included along the sensitive section as described above, it is possible to gauge a displacement at each position of the displacement gauge, which makes it possible to figure out the deformation of the sensitive section in more detail, and it is possible to further improve the accuracy of strain gauge.

Here, as a configuration for effectively exerting the above-described effect, in detail, a mode may be cited in which a shape of the sensitive section is tubular, and the plurality of displacement gauges are respectively provided along an axial direction of the sensitive section.

Further, as another configuration for effectively exerting the above-described effect, in detail, a mode may be cited in which the shape of the sensitive section is tubular, and the plurality of displacement gauges are respectively provided along a circumference of a plane perpendicular to an axis of the sensitive section.

Here, the plurality of displacement gauges may be respectively provided along the circumference of the plane so as to be disposed symmetrically to the center of the plane. In this case, it is possible to highly accurately sense displacements in various directions by the displacement gauges.

Further, as yet another configuration for effectively exerting the above-described effect, in detail, a mode may be cited in which the shape of the sensitive section is tubular, and the plurality of displacement gauges are respectively provided so as to be spiral along the axis direction of the sensitive section.

Further, a mode may be taken in which the inside of the container of the above-described strain gauge device is partitioned into a first space and a second space, the outer tube part and the piston are provided to the first space, the sensitive section is provided to the second space, the gauging unit gauges internal pressure of the second space in the container, and a valve mechanism that switches between a connection and a cutoff of the first space and the second space is further included.

As described above, the inside of the container is partitioned into a first space and a second space, the outer tube part and the piston are provided to the first space, and the valve mechanism that switches between a connection and a cutoff of the first space and the second space is further included. Therefore, the first space is changed in the internal pressure in response to sliding of the piston due to a change in external pressure, and on the other hand, in the case where the first space and the second space are cut off by the valve mechanism, the second space is brought into a state in which the second space does not receive a fluctuation in internal pressure of the first space. With the above-described configuration, for example, in a state in which the sensitive section of the strain gauge device is provided to the second space, and the first space and the second space are cut off by the valve mechanism, it is possible to gauge the internal pressure of the second space by the gauging unit. Accordingly, it is possible to fluctuate the internal pressures of the first space and the second space in the container so as to match to the external pressure due to the piston sliding, and it is possible to change the internal pressures according to the change in external pressure. Additionally, it is possible to highly accurately gauge a fluctuation of the sensitive section provided in the second space caused by generation of ground strain, which makes it possible to more accurately gauge strain.

Here, as a configuration for effectively exerting the above-described effect, in detail, a mode may be cited in which the valve mechanism includes a tubular member, a columnar member which is provided so as to be movable in a direction of axis of the tubular member inside of the tubular member, and a power unit that moves the columnar member, the tubular member has an opening in a side surface of the tubular member for connecting the inside of the tubular member and the second space, the columnar member has a flow path whose one end is connected to the first space and the other end is regarded as a coupling port provided to a side surface of the columnar member, and the coupling port is communicated with the opening when the columnar member is at a predetermined position in the inside of the tubular member, and is not communicated with the opening when the columnar member is at a position other than the predetermined position in the inside of the tubular member.

Advantageous Effects of Invention

In accordance with the present invention, it is possible to provide an underwater work device and an underwater strain gauge device which are capable of changing internal pressure of the container according to a change in external pressure.

BRIEF DESCRIPTION OF DRAWINGS

FIG. 9 are diagrams for explanation of the operation of the valve mechanism by driving of a power unit.

DESCRIPTION OF EMBODIMENTS

Figure 1:
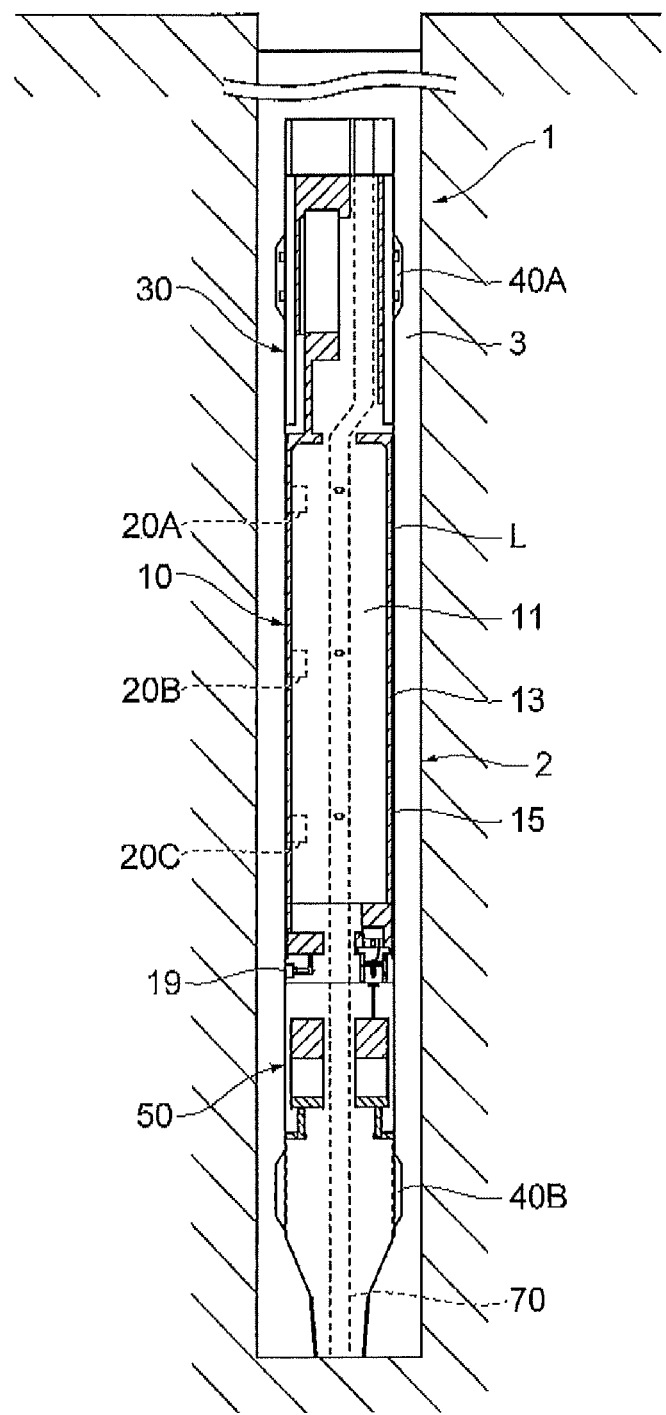
FIG. 1 is a schematic cross-sectional diagram of a strain gauge device to which a valve mechanism is attached, the strain gauge device according to the present invention.

Hereinafter, an embodiment for carrying out the present invention will be described in detail with reference to the accompanying drawings. In addition, in the description of the drawings, the same reference components are denoted by the same reference numerals, and overlapping descriptions thereof will be omitted.

Figure 2:
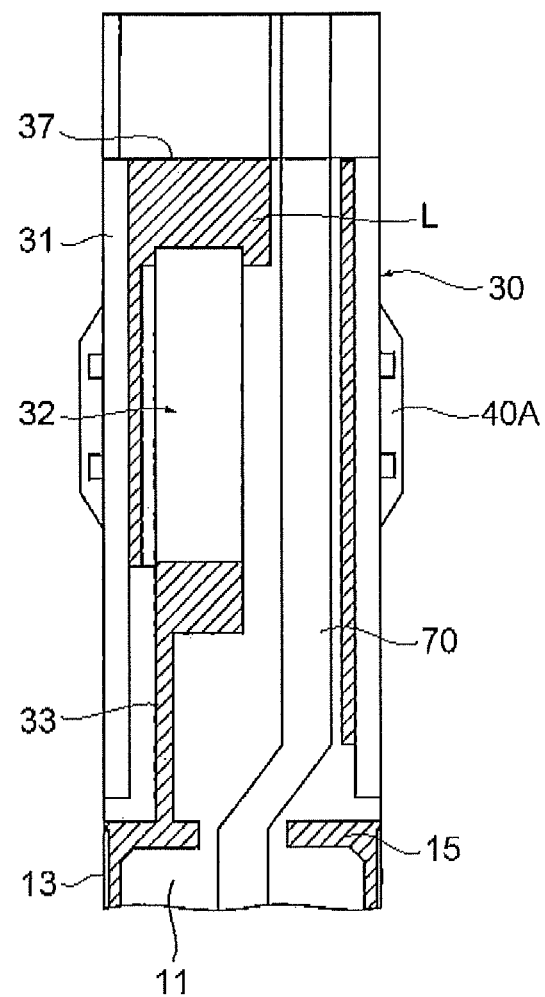
FIG. 2 is a schematic cross-sectional diagram of a gauging unit composing the strain gauge device.
Figure 3:
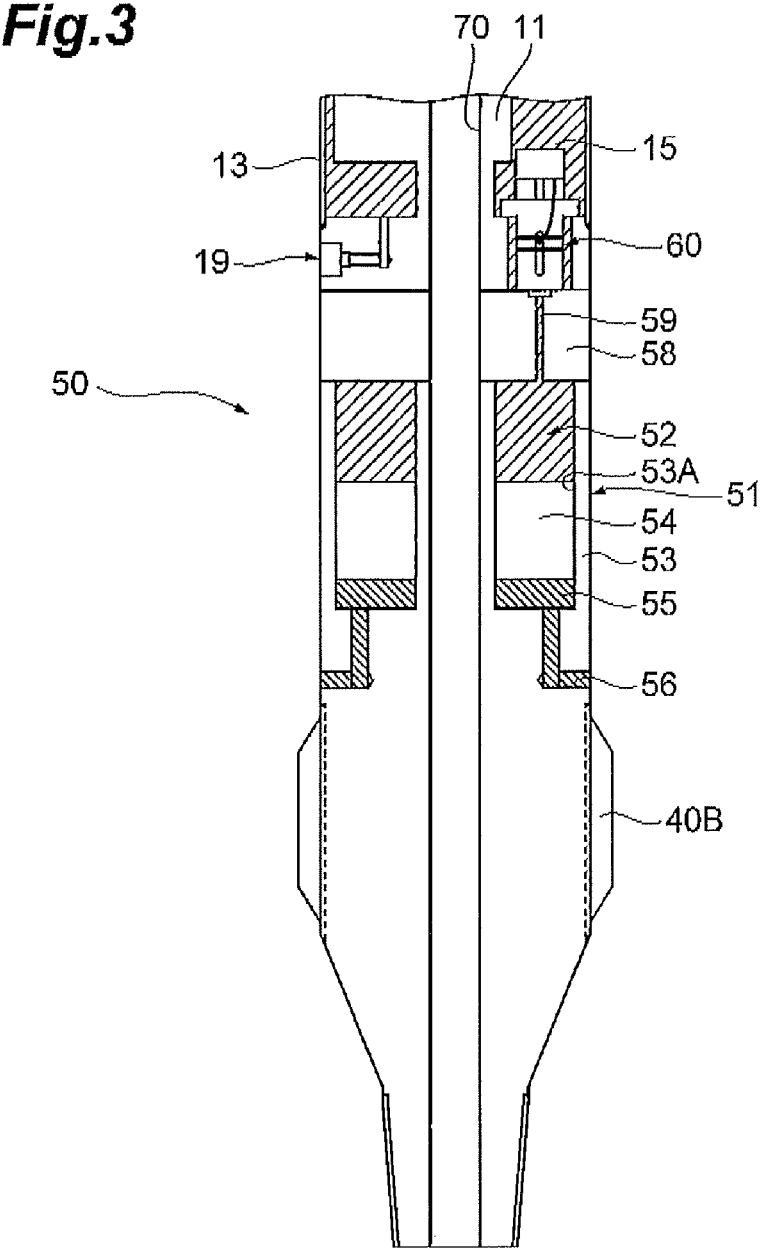
FIG. 3 is a schematic cross-sectional diagram of a pressure regulating unit composing the strain gauge device.

FIG. 1 is a schematic cross-sectional diagram of a strain gauge device 100 to which a valve mechanism 60 according to an embodiment is attached, FIG. 2 is a schematic cross-sectional diagram of a gauging unit 30 composing the strain gauge device 100, and FIG. 3 is a schematic cross-sectional diagram of a pressure regulating unit 50 composing the strain gauge device 100. First, the configurations of the valve mechanism according to the present embodiment and the strain gauge device to which the valve mechanism is attached will be described with reference to FIGS. 1 to 3.

The strain gauge device 100 according to the present embodiment is a device which is used underwater, that gauges ground strain on the basis of a change in side surface shape of the substantially cylindrical main body, and is a device which is suitably used for gauging in an environment at high pressure such as abyssal sea whose depth of water is 2000 m or more, and at a high temperature of 125° C. or more. This strain gauge device 100 is, as shown in FIG. 1, inserted into the inside of a vertical hole 2 extending in the vertical direction, which is formed in a ground 1 at the bottom of water. This strain gauge device 100 is, for example, a device with a diameter of approximately 200 mm and a length of approximately 3.8 m, and is inserted into the vertical hole 2 with a depth of approximately 3500 m which is provided in the ground 1 at the bottom of water with a depth of water of 2000 m or more for example, to be used. Then, after the strain gauge device 100 is installed in the inside of the vertical hole 2, the inside of the vertical hole 2 is filled with cement 3, thereby integrating the strain gauge device 100 with the ground 1. In this state, strain gauge of the ground 1 is performed.

The strain gauge device 100 is, as shown in FIG. 1, composed of a gauging unit 30, a sensing unit 10, and a pressure regulating unit 50, and those are disposed so as to be in this order from the upper side to the lower side when the strain gauge device 100 is inserted into the vertical hole 2. Moreover, a cement piping 70 is provided so as to pass through the gauging unit 30, the sensing unit 10, and the pressure regulating unit 50 in the strain gauge device 100. The cement piping 70 is a pipe for supplying cement for filling the circumference of the strain gauge device 100 after disposing thereof in the inside of the vertical hole 2. Further, a plurality of stabilizer fins 40 (40A, 40B) are attached to the circumference of the gauging unit 30 on the upper side and the circumference of the pressure regulating unit 50 on the lower side in the strain gauge device 100. These stabilizer fins 40 are attached in order to guide the strain gauge device 100 to dispose the strain gauge device 100 in the center of the vertical hole 2, and for preventing the strain gauge device 100 main body from bumping against the vertical hole 2 to be broken.

Next, the sensing unit 10, the gauging unit 30, and the pressure regulating unit 50 included in the strain gauge device 100 will be described.

The sensing unit 10 has a function of sensing a displacement by strain of the ground 1 around the strain gauge device 100. This sensing unit 10 is composed of an inner tube 11 having the cement piping 70 inside, an outer tube 13 (a container, a sensitive section) which is provided so as to cover the outer surface (side surface) of the inner tube 11. Then, the outer surface of the inner tube 11 and the inner surface of the outer tube 13 are provided with a space. The pressure regulating unit 50 which will be described later is provided below the sensing unit 10, and the gauging unit 30 which will be described later is provided above the sensing unit 10. Therefore, a sensitive region (second space) 15 which is a substantially cylindrical (ring-shaped) space is formed between the outer surface of the inner tube 11 and the inner surface of the outer tube 13, and the sensitive region 15 is filled with silicon oil L. The silicon oil L is injected from an injection port 19 provided on the lower side in the outer tube 13 to fill up the inside of the sensitive region 15. Further, a valve mechanism 60 is provided between the sensitive region 15 and a regulator oil containing region 52 (first space) which will be described later, and in the case where the sensitive region 15 and the regulator oil containing region 52 are connected via the valve mechanism 60, the silicon oil L moves in the both regions. In this way, the regulator oil containing region 52 and the sensitive region 15 are regions filled with fluid, and the outer tube 13 covering the sensitive region 15 and a housing part 53 covering the regulator oil containing region 52 function as a container containing the silicon oil L. In addition, the injection port 19 for injecting the silicon oil L is usually closed, and is open only when filling the silicon oil L.

The inner tube 11 of the sensing unit 10 is a highly rigid member made of stainless steel with a diameter of approximately 200 mm and a length of approximately 2 m. On the other hand, the outer tube 13 is made of stainless steel with a thickness of approximately 2.7 mm, and in the case where strain is generated around the strain gauge device 100 by a change in the ground 1, the outer tube 13 is deformable according to the strain. Accordingly, in the case where the outer tube 13 is deformed (elastically deformed) by strain of the circumference, to be dented toward the inner tube 11, the volume of the sensitive region 15 is decreased, to raise the internal pressure of the sensitive region 15. Then, the gauging unit 30 which will be described later gauges the change in internal pressure, to perform an analysis of strain around the strain gauge device 100. Although the outer tube 13 is an extremely thin member, it is adjusted so as to reduce a pressure difference between the external pressure of the strain gauge device 100 and the internal pressure of the sensitive region 15 by a pressure balance mechanism 51 which will be described later. Therefore, it is possible to prevent breakage derived from a pressure difference, to sense a minute deformation by strain.

Figure 4:
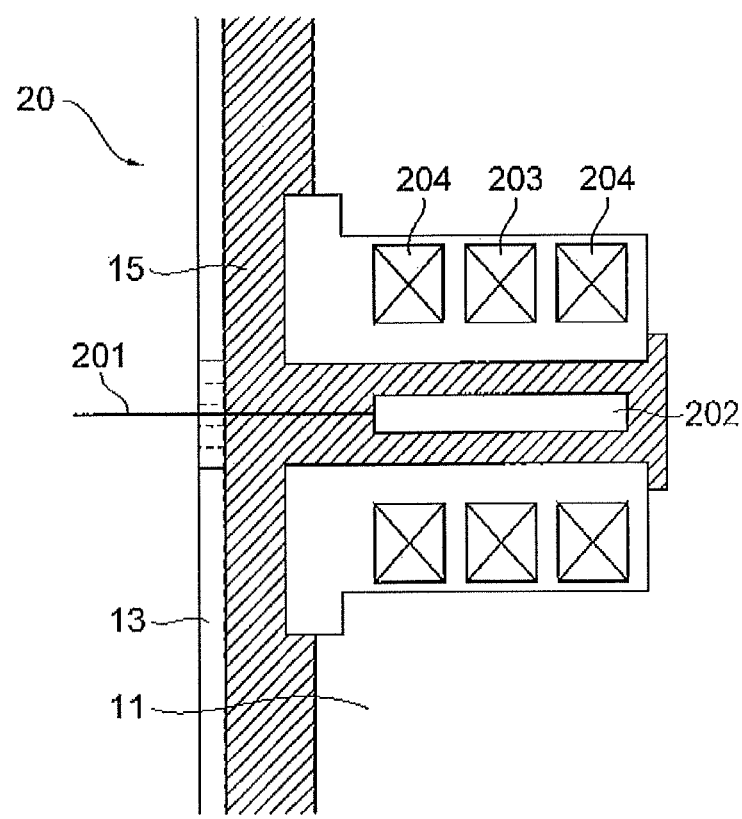
FIG. 4 is a schematic cross-sectional diagram of a differential displacement gauge.

Moreover, differential displacement gauges 20 (20A, 20B, 20C) are attached to the surface of the sensing unit 10 on the side surface of the strain gauge device 100. The configuration of the differential displacement gauge 20 is shown in FIG. 4. As shown in FIG. 4, the differential displacement gauge 20 is a so-called differential transformer system displacement gauge, and is equipped with a sensor head 201 exposed to the outside from the outer tube 13, an armature core 202 which is connected to the sensor head 201, and is installed in the sensitive region 15 to move so as to be interlocked with the sensor head 201, a primary coil 203 and two secondary coils 204 which are provided so as to cover the circumference of the armature core 202. The primary coil 203 and the two secondary coils 204 are installed in the inner tube 11. Further, it is configured such that the sensitive region 15 projects into the armature core 202 so as to dispose the armature core 202 in the inside of the sensitive region 15. Then, in the case where the sensor head 201 moves by generation of strain or the like in a state in which the primary coil 203 is excited on alternate-current (at a constant frequency voltage), the armature core 202 moves so as to be interlocked with the sensor head 201, thereby generating an inductor voltage in the secondary coils 204. The differential displacement gauge 20 senses the detection of the inductor voltage as displacement generation. The differential displacement gauge 20 with such a configuration is capable of performing high-sensitive and high resolution gauging.

Here, in the case where a pressure difference between the external pressure of the strain gauge device 100 and the internal pressure of the sensitive region 15 is large, it is difficult to precisely detect a movement of the sensor head 201 by generation of strain, and therefore, it is difficult to apply the differential displacement gauge 20 to the strain gauge device 100. However, in the strain gauge device 100 of the present embodiment, it is adjusted that a pressure difference between the external pressure of the strain gauge device 100 and the internal pressure of the sensitive region 15 is reduced by the pressure balance mechanism 51 which will be described later. Therefore, it is possible to highly accurately sense a minute movement of the sensor head 201 by generation of strain by the installed differential displacement gauge 20.

In the strain gauge device 100 of the present embodiment, the above-described differential displacement gauges 20 (20A, 20B, 20C) are attached to three positions along the extending direction (the vertical direction) of the sensing unit 10. Moreover, the differential displacement gauges 20 are attached at three places along the circumferential outer surface of the outer tube 13 at each of the positions. Accordingly, in the strain gauge device 100 of the present embodiment, the nine differential displacement gauges 20 are attached, and the gauged results by these differential displacement gauges 20 are transmitted to an analysis unit (not shown), to be used for detailed analysis on strain generated in the ground 1 along with a gauged result of a generated amount of strain by a pressure gauge which will be described later, and in particular, for analysis on the generating direction of strain, the size thereof, and the like. Accordingly, due to a plurality of the differential displacement gauges 20 being disposed at different positions as in the strain gauge device 100 of the present embodiment, it is possible to gauge many components of strain that is a tensor, which makes it possible to gauge a bearing and a height (a depth) in which the strain causing a pressure fluctuation (a volume fluctuation) in the sensitive region 15 is generated, and a size of the strain.

In addition, the number and the attachment positions of the differential displacement gauges 20 are appropriately changed in consideration of the characteristics and the like of the ground 1 serving as an object to be gauged. As an example of attachment positions, for example, a layout along an axial direction of the outer tube 13 composing the sensing unit 10, a layout along the circumference of the plane perpendicular to the axis of the outer tube 13 in the outer surface of the outer tube 13, a layout in which the differential displacement gauges 20 become spiral along the axial direction of the outer tube 13, and the like can be cited. Further, in the case where a plurality of the differential displacement gauges 20 are disposed along the circumferential outer surface of the outer tube 13 which is the outer surface of a plane perpendicular to the axis of the outer tube 13, it is possible to dispose the differential displacement gauges 20 so as to be symmetrical to the center of the outer tube 13. In this case, it is possible to highly accurately sense displacements in various directions by the differential displacement gauges 20.

Next, the gauging unit 30 will be described. The gauging unit 30 has a function of gauging a size of a pressure fluctuation (volume fluctuation) of the sensitive region 15 of the above-described sensing unit 10, to gauge a size of strain. As shown in FIG. 2, the gauging unit 30 is composed of a pressure resistant outer tube 31 and a pressure gauge storage part 32. The pressure gauge storage part 32 is contained in the pressure resistant outer tube 31 with an outer diameter which is substantially the same as the outer tube 13 of the sensing unit 10, and further, the cement piping 70 is installed in the pressure resistant outer tube 31. A crystal pressure gauge (Trade name: PARO, Type: Submersible Depth Sensors 8B7000-2, which are manufactured by Paroscientific, Inc.) for gauging pressure of the silicon oil L in the sensitive region 15 is contained in the pressure gauge storage part 32, and a flow path 33 connecting the gauging unit of the pressure gauge contained in the pressure gauge storage part 32 and the sensitive region 15 is provided therein. A gauged result by the pressure gauge is transmitted to the analysis unit, to be used for analysis of strain generated in the ground 1 along with the gauged results by the differential displacement gauges 20 as described above. The method of gauging strain by the pressure gauge described above and the configuration in which the sensing unit 10 and the gauging unit 30 are connected is the same as the configuration of the conventional strain gauge.

Further, the circumference of the pressure gauge storage part 32 and the upper side of the pressure gauge storage part 32 in the gauging unit 30 are connected to the sensitive region 15, and are filled with the silicon oil L. Further, a pressure backup plate 37 is provided on the upper side of the pressure gauge storage part 32 and at the upper portion of the region connected to the sensitive region 15, and the pressure backup plate 37 has a function of backing up so as to prevent the silicon oil L in the sensitive region 15 from going to the upper side of the strain gauge device 100. Then, an analysis unit (not shown) is provided above the pressure backup plate 37, where an analysis on strain generated in the ground 1 and storage of the analyzed result are performed by use of the gauged results by the differential displacement gauges 20 described above and the gauged result by the pressure gauge in the pressure gauge storage part 32. The analyzed result by the analysis unit is transmitted to a system for performing detailed analysis which is provided on the ground, for example, via radio or wire communication. In addition, the controls of the respective devices and the like included in the gauging unit 30 and the control of the power unit 65 which will be described later are performed by a control unit (not shown). This control unit is composed of a CPU (Central Processing Unit) and an external storage device, and the CPU has a ROM (Read Only Memory) in which an arithmetic program for performing predetermined arithmetic processing is stored, and a RAM (Random Access Memory) that stores various data in arithmetic processing, and these function to perform the controls of the respective devices and the like included in the gauging unit 30 and the control of the power unit 65.

Next, the pressure regulating unit 50 will be described. The pressure regulating unit 50 has a function of regulating the pressure in the inside of the sensitive region 15. Because the strain gauge device 100 according to the present embodiment can be attached to the bottom portion of the vertical hole provided at the bottom of water as described above, the pressure around the strain gauging device 100 is much higher than the pressure on the ground, that is approximately 100 MPa, and the surrounding temperature is raised to approximately 125° C. Accordingly, in the case where the sensitive region 15 in the strain gauge device 100 is filled with the silicon oil L on the ground, to be moved to the bottom portion of the vertical hole at the bottom of water that is the gauging position, the external pressure around the strain gauge device 100 becomes much higher than the pressure of the silicon oil L in the sensitive region 15, and it is impossible to appropriately gauge a minute change such as ground strain. Further, because the strain is gauged by sensing a pressure fluctuation (a volume fluctuation) of the sensitive region 15 when gauging strain by the strain gauge device 100, if the pressure of the sensitive region 15 is fluctuated by a reason other than strain, the accuracy of gauging is lowered. From these reasons, the pressure regulating unit 50 having a function of regulating the pressure in the inside of the sensitive region 15 according to a change in external pressure is provided.

As shown in FIG. 3, the pressure regulating unit 50 is equipped with the pressure balance mechanism 51 that fluctuates the pressure of the regulator oil containing region (first space) which is connectable to the sensitive region 15 according to the external pressure around the strain gauging device 100, and the valve mechanism 60 that switches between a connection and a cutoff of the regulator oil containing region (first space) and the sensitive region (second space).

The pressure balance mechanism 51 is composed of the cylindrical housing part 53 forming the side surface of the strain gauge device 100, and a piston 54 which is slidable in a tubular opening portion 53A installed in the housing part 53. In more detail, because the cement piping 70 is installed in the strain gauge device 100 of the present embodiment, the piston 54 is doughnut-shaped so as to block the inner surface of the housing part 53 and the external side surface of the cement piping 70. Then, the upper side (the sensitive region 15 side) from the piston 54 in the inside of the housing part 53 is regarded as the regulator oil containing region 52, and the lower side from the piston 54 is regarded as a muddy water containing region 55. In the case where the silicon oil L is injected into the regulator oil containing region 52, and the regulator oil containing region 52 and the sensitive region 15 are connected via the valve mechanism 60 which will be described later, the silicon oil L moves in the inside therebetween. A muddy water injection hole 56 for supplying external muddy water (fluid) is connected to the muddy water containing region 55. Thereby, equalizing the pressure in the inside of the muddy water containing region 55 and the external pressure around the strain gauge device 100. That is, the housing part 53 of the pressure balance mechanism 51 functions as an outer tube part including the opening portion 53A communicated with the outside.

Here, when the external pressure around the strain gauge device 100 is raised, the pressure in the inside of the muddy water containing region 55 as well is raised, which generates the force of moving the piston 54 in a direction in which the volume of the muddy water containing region 55 is increased, that is, to the upper side. Then, when the piston 54 moves to the upper side, the volume of the regulator oil containing region 52 is decreased, and the pressure in the inside on the regulator oil containing region 52 side is raised. Here, in the case where the regulator oil containing region 52 and the sensitive region 15 are connected, both pressures are raised. Then, the piston 54 is held at a position at which the pressure on the muddy water containing region 55 side and the pressure on the regulator oil containing region 52 side are equalized. In this way, the pressure balance mechanism 51 has a function of regulating the internal pressure according to the external pressure due to the piston 54 moving to a position at which the internal pressure and the external pressure are equalized, according to a fluctuation in external pressure.

Figure 5:
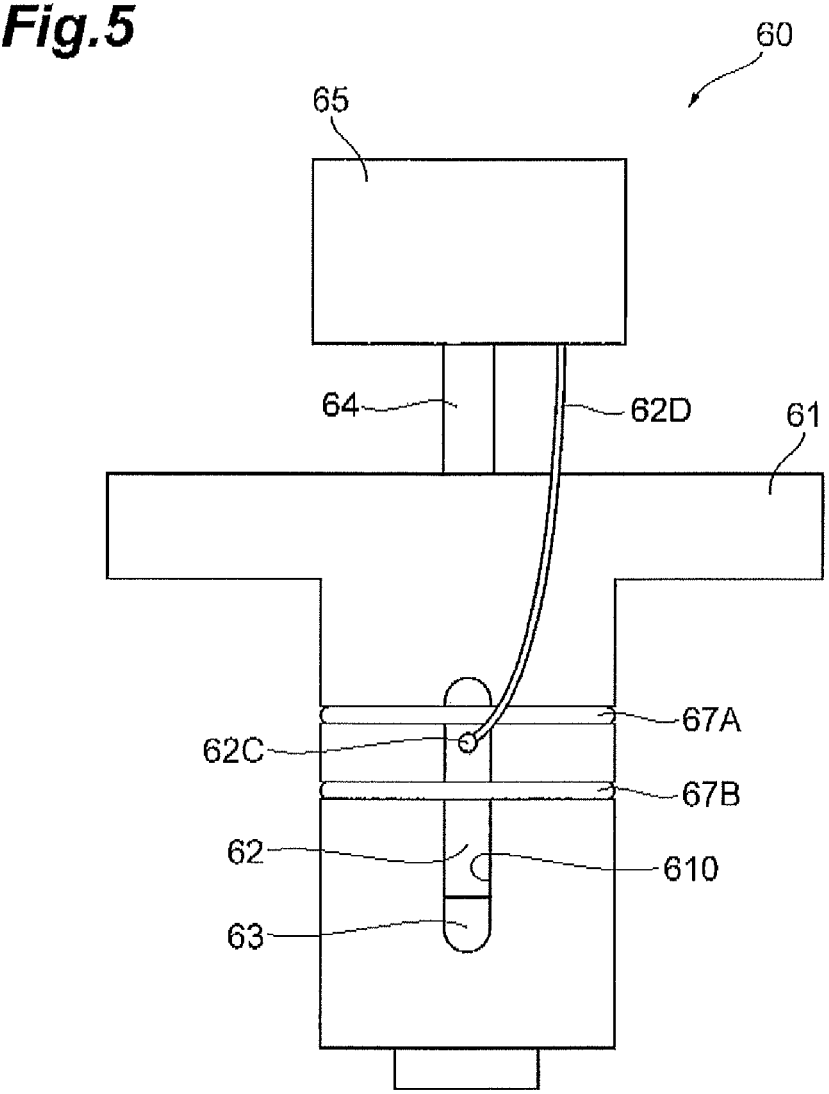
FIG. 5 is a schematic diagram showing the appearance of the valve mechanism.
Figure 7:
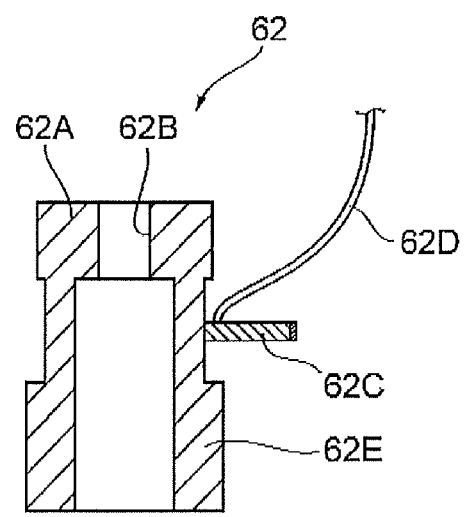
FIG. 7 is a cross-sectional diagram of a valve sleeve taken along the line VII to VII of FIG. 6.
Figure 8:
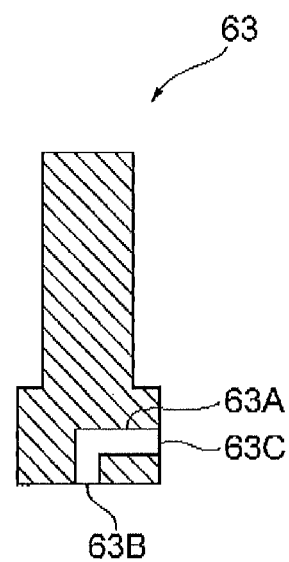
FIG. 8 is a cross-sectional diagram of a valve plunger taken along the line VIII to VIII of FIG. 6.

Next, the valve mechanism 60 will be described. The valve mechanism 60 is provided so as to have contact with the upper side of a bulkhead 58 in which a flow path 59 connected to the regulator oil containing region 52 is provided, and is provided at a position at which the valve mechanism 60 contacts the sensitive region 15 in the inside of the sensing unit 10. The configuration and the operation of the valve mechanism 60 will be described with reference to FIGS. 5 to 8. FIG. 5 is a schematic diagram showing the appearance of the valve mechanism, FIG. 6 is a schematic cross-sectional diagram for explanation of the configuration of the valve mechanism (a cross-sectional diagram when the valve mechanism 60 is viewed from the vertical direction with respect to the sheet of FIG. 5), FIG. 7 is a cross-sectional diagram (a cross-sectional diagram taken along the line VII to VII of FIG. 6) for explanation of the configuration of a valve plunger included in the valve mechanism, and FIG. 8 is a cross-sectional diagram (a cross-sectional diagram taken along the line VIII to VIII of FIG. 6) for explanation of the configuration of a valve sleeve included in the valve mechanism.

Figure 6:
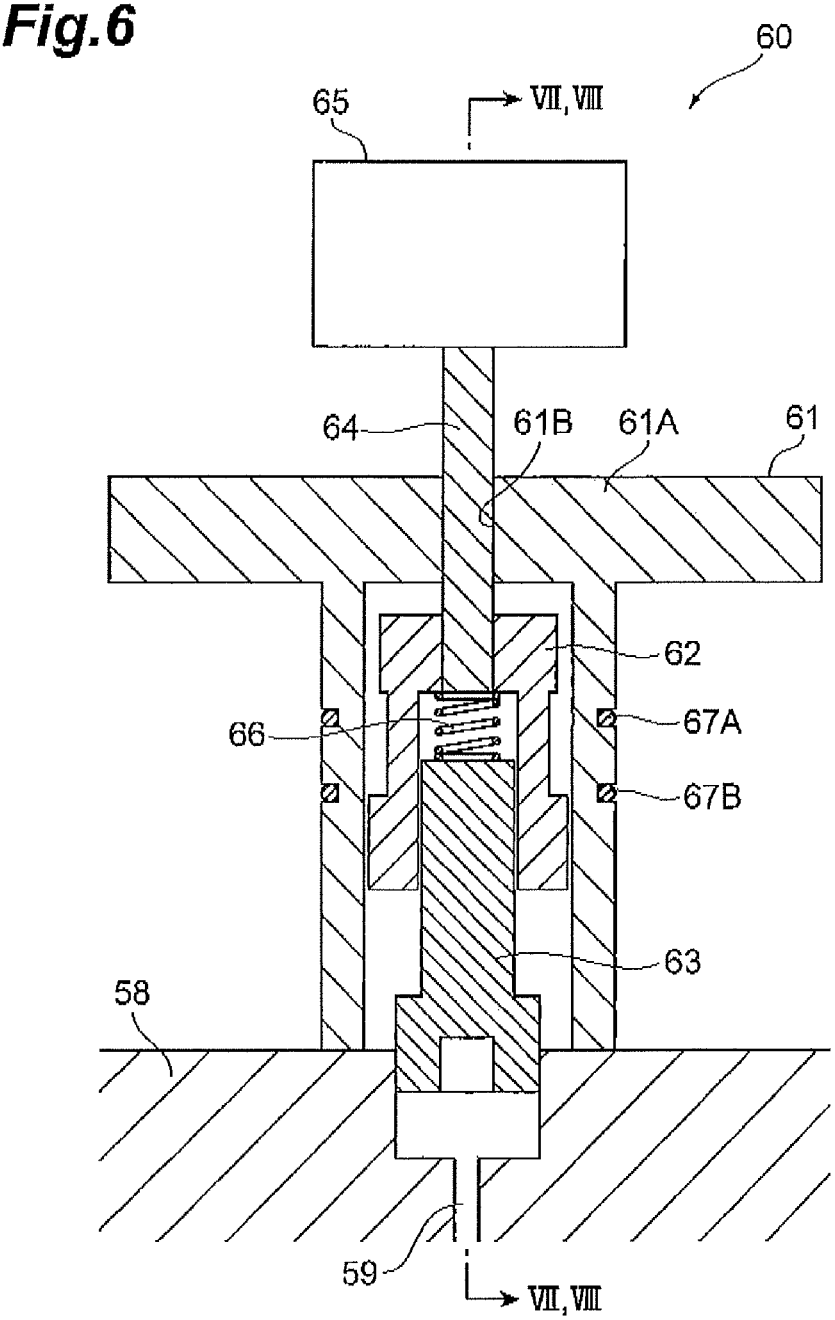
FIG. 6 is a cross-sectional diagram of the valve mechanism viewed in a direction perpendicular to the sheet of FIG. 5.

As shown in FIGS. 5 and 6, the valve mechanism 60 is composed of a valve holder (a valve base, a tubular member) 61, a valve sleeve (a first member) 62, a valve plunger (a second member) 63, a valve screw 64, and a power unit 65. The valve sleeve 62 is a substantially cylindrical member which is installed in the valve holder 61, and is movable in a direction of axis (the vertical direction shown in the figure) in the inside of the valve holder 61. Further, the valve plunger 63 is a member installed inside the valve sleeve 62. Further, the valve screw 64 is a member which is inserted into an opening 61B of a bottom portion 61A provided on the end side which is provided so as to be spaced from the bulkhead 58 of the valve holder 61, and the valve screw 64 is extended along the direction of axis of the valve holder 61 to be slidable with respect to the opening 61B, and is further fixed to the valve sleeve 62 by a screw clamp. Then, the power unit 65 includes the power unit 65 which is connected to the valve screw 64 on the external side of the valve holder 61, to move the valve screw 64 along the direction of axis of the valve holder 61. The valve sleeve 62 and the valve plunger 63 are connected with an elastic member 66. As shown in FIG. 5, an end on the lower side of the valve holder 61 is attached so as to have contact with the bulkhead 58, which brings about a configuration in which the valve sleeve 62 and the valve plunger 63 are provided in a space surrounded by the internal side of the valve holder 61 and the bulkhead 58.

The valve holder 61 is a substantially cylindrical member, and its end side (the upper side shown in the figure) provided so as to be spaced from the bulkhead 58 is the bottom portion 61A having an opening 61B in the center. The diameter of the opening 61B is smaller than the inner diameter of the valve holder 61. Further, the valve holder 61 includes a slit 610 extended along the direction of axis in the side surface. The external side of the slit 610 (the external side of the valve holder 61) contacts the sensitive region 15 as shown in FIG. 3. That is, the slit 610 is regarded as an opening for connecting the sensitive region 15 and the inside of the valve holder 61.

To return to FIG. 5, two grooves spaced from each other are provided so as to perpendicularly cross the extending direction of the slit 610 in the external side of the valve holder 61, and two rings 67A and 67B are attached to the respective two grooves. The rings 67A and 67B are made of, for example, metal having electrical conductivity, and function as a part of sensing means that senses a position of the valve sleeve 62 contained in the inside of the valve holder 61. This function as sensing means will be described later.

The valve sleeve 62 is a substantially cylindrical member as shown in FIG. 7, and its one side (the upper side shown in the figure) is a bottom portion 62A having the opening 62B in the center. Then, the valve screw 62 extending in the direction of axis of the valve holder 61 is screwed into the opening portion 62B. Then, the side surface of the external side of the valve sleeve has a projecting portion 62C projecting outward, and this projecting portion 62C is connected to the power unit 65 via a conductor wire 62D covered with an insulating material. Then, with respect to the valve sleeve 62, this projecting portion 62C is attached to the inside of the valve holder 61 via the slit 610 from the internal side of the valve holder 61, so as to project outward from between the rings 67A and 67B attached to the side surface of the valve holder 61. Then, the valve plunger 63 is inserted into the internal side of the valve sleeve 62. Then, in the case where the valve sleeve 62 moves in the valve holder 61, and the projecting portion 62C comes into contact with the rings 67A and 67B, this is transmitted to the power unit 65. That is, the projecting portion 62C and the conductor wire 62D function as a part of the sensing means. This function as sensing means will be described later.

Further, the above-described valve sleeve 62 has a flange portion 62E touching inner surface of the valve holder 61 at the end (the lower side shown in the drawing) opposite to the side on which the bottom portion 62A is provided. The slit 610 of the valve holder 61 is provided so as to extend lower than the flange portion 62E. In detail, as shown in FIG. 5, the slit 610 of the valve holder 61 is provided so as to extend to a position at which the valve plunger 63 can be seen when seeing the inside of the slit 610 from the external side of the valve holder 61. With such a configuration, a coupling port 63C of the flow path provided at the valve plunger 63 which will be described later and the slit 610 serving as the opening having contact with the sensitive region 15 can be communicated with one another. In addition, it may be a configuration that an opening connected to the sensitive region 15 to be communicated with the coupling port 63C is provided separately from the slit 610.

The valve plunger 63 is a cylindrical member as shown in FIG. 8, and internally includes the flow path 63A. With respect to the flow path 63A, an opening 63B on one side (the lower side) is provided at the end of the valve plunger 63, and this opening 63B is, as shown in FIG. 3, connected to the flow path 59 connected to the regulator oil containing region 52. Further, the other side (the upper side) of the flow path 63A is regarded as the coupling port 63C provided at the side surface of the valve plunger 63. Then, with respect to the valve plunger 63, as shown in FIG. 6, the elastic member 66 is attached to the end (the end on the upper side in FIG. 6) opposite to the end in which the opening 63B of the flow path 63A is provided, and the valve plunger 63 is connected to the inner surface of the valve sleeve 62 via the elastic member 66.

As the elastic member 66, for example, a coil spring or the like is suitably used. In the case where a spring is used as the elastic member 66, the constant of spring thereof is selected in consideration of a difference between the external pressure allowable in the strain gauge device 100 and the internal pressure of the sensitive region 15. That is, because the elastic member 66 is driven in order to reduce a difference between the external pressure of the strain gauge device 100 and the internal pressure of the sensitive region 15, for example, in the case where the components of the strain gauge device 100 may be broken when a pressure difference becomes greater than a predetermined value, the constant of spring is selected such that the spring shrinks by the pressure which does not exceed the pressure difference.

To return to FIGS. 5 and 6, the power unit 65 is composed of, for example, a high-pressure resistant motor or the like, that has a function of moving the valve screw 64 along the direction of axis of the valve holder 61. Then, the power unit 65 moves the valve screw 64, to move the valve sleeve 62 fixed to the valve screw 64 by a screw clamp. Moreover, because the one side (the upper side shown in the drawing) of the valve plunger 63 is coupled with the inner surface of the valve sleeve 62 via the elastic member 66, the valve plunger 63 moves in response to a movement of the valve sleeve 62. That is, the valve sleeve 62 and the valve plunger 63 described above function as a columnar member which is movable in the direction of axis in the inside of the valve holder 61. Driving of the power unit 65 is started by an instruction from the control unit (not shown), and a change in electric potential caused by the contact between the ring 67B and the projection portion 63C is notified to the power unit 65 via the conductor wire 62D, thereby the power unit 65 stops by sensing that the valve sleeve 62 has moved to a predetermined position.

Figure 10:
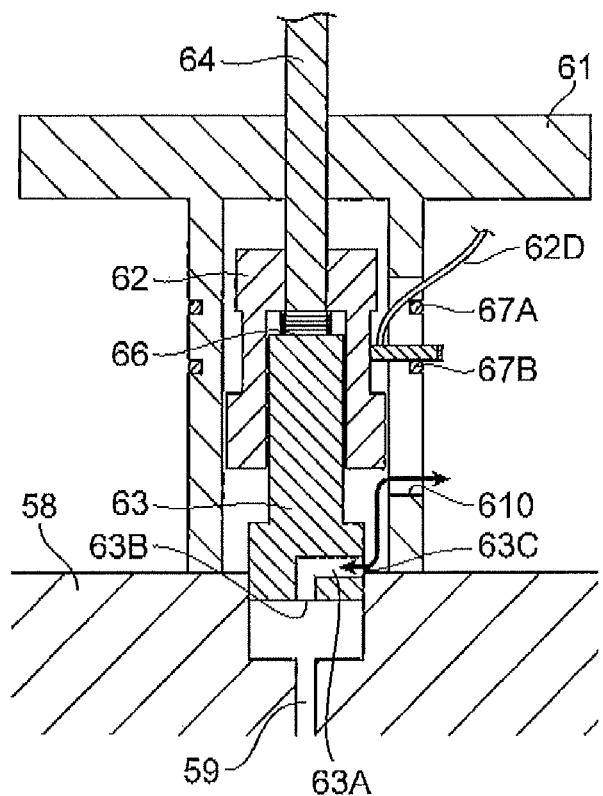
FIG. 10 is a diagram for explanation of a case where the valve plunger of the valve mechanism moves without driving of the power unit.

The operation of the valve mechanism 60 having the above-described configuration will be described with reference to FIGS. 9 and 10. FIG. 9 is a diagram for explanation of the operation of the valve mechanism 60 by driving of the power unit 65, and FIG. 10 is a diagram for explanation of a case where the valve plunger 63 of the valve mechanism 60 moves without driving of the power unit 65.

First, the operation of the valve mechanism 60 by driving of the power unit 65 will be described with reference to FIG. 9. FIG. 9A is a diagram for explanation of a state in which the regulator oil containing region 52 and the sensitive region 15 are connected, and FIG. 9B is a diagram for explanation of a state in which the regulator oil containing region 52 and the sensitive region 15 are cut off. The operation of the valve mechanism 60 by driving of the power unit 65 is performed before the start of gauging after the strain gauge device 100 is lowered down from the ground up to the bottom portion of the vertical hole 2 in the ground 1 at the bottom of water which is a gauging position in order to be used for gauging.

Here, because the external pressure around the strain gauge device 100 greatly fluctuates when the strain gauge device 100 is moved from the ground up to the bottom portion of the vertical hole 2, a pressure regulation by allowing the sensitive region 15 and the regulator oil containing region 52 to be communicated with one another is performed by the pressure balance mechanism 51. The term "communicated with" here means, in detail, that the silicon oil L is allowed to circulate through the regulator oil containing region 52, the flow path 59 in the bulkhead 58, the flow path 63A in the valve plunger 63, the inside of the valve holder 61, and the sensitive region 15. When the strain gauge device 100 is lowered down from the ground up to the bottom portion of the vertical hole 2, the external pressure is increased according to the dropping of the strain gauge device 100. Because the pressure of the muddy water containing region 55 is increased according to the rise in external pressure, the piston 54 of the pressure balance mechanism 51 moves upward so as to equalize the pressure of the muddy water containing region 55 and the pressure of the regulator oil containing region 52. The movement of the piston 54 is continuously performed according to a rise in external pressure.

During the above-described time, i.e., when the strain gauge device 100 is lowered down toward a position at which strain gauging is performed, as shown in FIG. 9A, the valve sleeve 62 and the valve plunger 63 are disposed at the position at which the regulator oil containing region 52 and the sensitive region 15 are connected. In detail, the valve sleeve 62 is disposed such that the projecting portion 62C attached to the side surface of, the valve sleeve 62 is brought to a position so as to have contact with the upper ring 67A between the two rings attached to the circumference of the valve holder 61. Then, the coupling port 63C of the internal valve plunger 63 and the slit 61O of the valve holder 61 are communicated with one another, thereby bringing the regulator oil containing region 52 and the sensitive region 15 into a connected (communicating) state via the flow path 59 connecting to the opening 63B in the valve plunger 63 and the flow path 63A in the valve plunger 63, to change the pressure of the sensitive region 15 so as to be the same as the pressure of the regulator oil containing region 52. Accordingly, the piston 54 of the pressure balance mechanism 51 moves upward according to a rise in external pressure (the pressure of muddy water) so as to increase the pressure of the regulator oil containing region 52, and the pressure fluctuates so as to equalize the pressure in the regulator oil containing region 52 and the pressure in the sensitive region 15 connected to the regulator oil containing region 52 with each other.

Next, the case where the regulator oil containing region 52 and the sensitive region 15 are cut off by the valve mechanism 60 will be described. It is configured such that, at the time of starting strain gauging after the strain gauge device 100 is installed on the bottom portion of the vertical hole 2, and the circumference of the strain gauge device 100 is filled with cement, the sensitive region 15 is fluctuated in volume only by the effect of strain from the outer tube 13 of the sensing unit 10 by cutting off the sensitive region 15 and the regulator oil containing region 52. Accordingly, the operation of the valve mechanism 60 by driving of the power unit 65 is performed at a point in time when the strain gauge device 100 is installed in a stable state for gauging, that is, after the strain gauge device 100 is installed in the vertical hole 2, and the circumference thereof is filled with cement. In addition, because the muddy water containing region 55 is connected to the outside via the muddy water injection hole 56 even after the circumference of the strain gauge device 100 is filled with cement, the piston 54 of the pressure balance mechanism 51 is movable in the vertical direction in response to a fluctuation in external pressure. However, because the sensitive region 15 and the regulator oil containing region 52 are cut of by the valve mechanism 60, a change in pressure of the regulator oil containing region 52 by a movement of the piston 54 is not transmitted to the sensitive region 15 until a pressure difference between the sensitive region 15 and the regulator oil containing region 52 exceeds a given value.

As the operation of the valve mechanism 60, after the strain gauge device 100 is placed at the position at which strain gauging is performed, that is, on the bottom portion of the vertical hole 2, and the circumference thereof is filled with cement, as shown in FIG. 9B, the power unit 65 is driven by an instruction of the control unit, thereby moving the valve sleeve 62 and the valve plunger 63 to the position at which the regulator oil containing region 52 and the sensitive region 15 are cut off. In detail, the control unit which has sensed the completion of filling of the cement instructs the power unit 65 to start driving of the power unit 65, and the valve sleeve 62 and the valve plunger 63 are moved downward, and the projecting portion 62C attached to the side surface of the valve sleeve 62 moves up to a position at which the projecting portion 62C contacts the lower ring 67B between the two rings attached to the circumference of the valve holder 61. At this time, because the coupling port 63C in the internal valve plunger 63 moves to a position at which the coupling port 63C faces the inner wall of the bulkhead 58, the coupling port 63C and the slit 610 in the valve holder 61 are brought into a non-communicating state. In accordance therewith, the regulator oil containing region 52 and the sensitive region 15 are cut off, which does not allow the silicon oil L to move to the inside thereof. Then, when it is transmitted to the power unit 65 via the conductor wire 62D that the projecting portion 62C and the ring 67B contact each other, the power unit 65 stops driving, to stop the movement of the valve sleeve 62 and the valve plunger 63. In this way, because the power unit 65 senses the contact between the projecting portion 62C and the ring 67B, to stop the movement of the valve sleeve 62 and the valve plunger 63, there is no need to include a complicated control program or the like relating to a stoppage of driving of the power unit 65, and it is possible to suppress electric power consumption by unnecessary driving of the power unit 65.

Next, the case where the valve plunger 63 of the valve mechanism 60 moves without driving of the power unit 65 will be described with reference to FIG. 10. This is caused in the case where the external pressure of the strain gauge device 100 is increased by a change in environment around the strain gauge device 100 (for example, a change in water temperature) in a state in which the strain gauge device 100 is placed at the bottom portion of the vertical hole 2 and the circumference thereof is filled with cement, and the valve sleeve 62 and the valve plunger 63 are moved downward by driving of the power unit 65, thereby cutting off the regulator oil containing region 52 and the sensitive region 15 as shown in FIG. 9B. In the case where the external pressure is increased, the piston 54 of the pressure balance mechanism 51 moves, thereby equalizing the internal pressures of the muddy water containing region 55 and the regulator oil containing region 52. At this time, because the regulator oil containing region 52 and the sensitive region 15 are cut off as shown in FIG. 9B, the pressure in the sensitive region 15 does not vary according to a fluctuation in external pressure. However, in the case where a fluctuation in external pressure is great (for example, in the case where a difference between the internal pressure and the external pressure becomes 5 MPa or more) is left as it is, the outer tube 13 may be likely broken by the pressure difference because the outer tube 13 composing the sensing unit 10 is extremely thin.

On the other hand, the strain gauge device 100 of the present embodiment has a configuration in which the elastic member 66 shrinks in the case where the pressure in the inside of the regulator oil containing region 52 is higher than the pressure in the inside of the sensitive region 15. Then, as shown in FIG. 10, in the case where a difference between the pressure in the inside of the sensitive region 15 and the pressure in the inside of the regulator oil containing region 52 varying according to the external pressure is made greater than a predetermined value, the elastic member 66 shrinks, thereby making the coupling port 63C of the valve plunger 63 inside thereof and the slit 610 of the valve holder 61 be communicated with one another, and the regulator oil containing region 52 and the sensitive region 15 are connected via the flow path 59 connecting the opening 63B of the valve plunger 63 and the flow path 63A inside the valve plunger 63. Then, the pressure in the inside of the sensitive region 15 is fluctuated so as to reduce a pressure difference between the regulator oil containing region 52 and the sensitive region 15. Then, when the pressure difference is made less than a predetermined value, by the restoring force of the elastic member 66, as shown in FIG. 9B, the regulator oil containing region 52 and the sensitive region 15 are returned to the cutoff state.

In this way, the device has the configuration in which, even in the case where a connection and a cutoff between of the regulator oil containing region 52 and the sensitive region 15 are not switched by driving of the power unit 65, in the case where a pressure difference between the regulator oil containing region 52 and the sensitive region 15 exceeds a predetermined value, the valve plunger 63 moves. Therefore, it is possible to achieve a pressure regulation independent of driving of the power unit 65 with the simple configuration, and to prevent the breakage of the outer tube 13 of the sensing unit 10.

As described above, in the strain gauge device 100 according to the present embodiment, the piston 54 attached to the tubular opening portion 53A provided at the housing part 53 slides in response to the external pressure. Thereby varying the volumes of the regulator oil containing region 52 and the sensitive region 15 so as to achieve a balance with the external pressure, to change the internal pressure. Then, in the above-described strain gauge device 100, because the internal pressures of the regulator oil containing region 52 and the sensitive region 15 are changed according to a change in external pressure only by sliding of the piston 54, it is possible to easily perform regulation of the internal pressure. Further, because the above-described pressure balance mechanism 51 is achieved with a simple configuration, it is possible to easily perform regulation of the external pressure and the internal pressure even in a high-temperature/high-pressure environment.

Then, in the above-described strain gauge device 100, because the internal pressures of the regulator oil containing region 52 and the sensitive region 15 are changed so as to reduce a difference between the external pressure and the internal pressure according to a change in external pressure only by sliding of the piston 54 in the pressure balance mechanism 51, it is possible to include the outer tube 13 formed of a member deformable (elastically deformed) according to the external pressure as a part of the container covering the sensitive region 15, which makes it possible to gauge a change in pressure by a deformation of the outer tube 13 even in a high-pressure environment such as underwater.

Further, in the above-described strain gauge device 100, because the differential displacement gauge 20 that senses a displacement of the outer tube 13 is further included, which makes it possible to gauge a displacement which is difficult to be sensed by a change in internal pressure of the sensitive region 15 by a deformation of outer tube 13, this makes it possible to more accurately gauge strain. Further, as the above-described strain gauge device 100, in a mode in which a plurality of the differential displacement gauges 20 are included so as to correspond to the outer tube 13, it is possible to gauge a displacement at each position of the differential displacement gauge 20, which makes it possible to figure out the deformation of the outer tube 13 in more detail, and it is possible to further improve the accuracy of strain gauge.

Further, in the strain gauge device 100, because the region in which the silicon oil L is contained is partitioned into the regulator oil containing region (the first space) 52 and the sensitive region (the second space) 15, and the housing 53

(outer tube part) connected to the outside and the piston 54 are attached to the regulator oil containing region 52, and the valve mechanism 60 that switches between a connection and a cutoff of the regulator oil containing region 52 and the sensitive region 15 is included therebetween, the regulator oil containing region 52 is changed in the internal pressure in response to sliding of the piston 54 due to a change in external pressure. On the other hand, in the case where the regulator oil containing region 52 and the sensitive region 15 are cut off by the valve mechanism 60, the sensitive region 15 is brought into a state in which the sensitive region 15 does not receive a fluctuation in internal pressure of the regulator oil containing region 52. With the above-described configuration, it is possible to gauge the internal pressure of the sensitive region 15 in a state in which the outer tube 13 functioning as a sensitive section of the strain gauge device 100 is provided on the side of the sensitive region 15, and the regulator oil containing region 52 and the sensitive region 15 are cut off by the valve mechanism 60. Accordingly, it is possible to fluctuate the internal pressures of the regulator oil containing region 52 and the sensitive region 15 in the container so as to be matched to the external pressure due to the piston 54 sliding, and it is possible to change the internal pressures according to a change in external pressure. Additionally, it is possible to highly accurately gauge a fluctuation caused by generation of ground strain in the outer tube 13 provided on the side of the sensitive region 15, which makes it possible to more accurately gauge strain.

Then, according to the valve mechanism 60 of the strain gauge device 100 of the present embodiment, when the columnar member composed of the valve sleeve 62 and the valve plunger 63 moves in the inside of the valve holder 61 by driving of the power unit 65, to be at a predetermined position, the coupling port 63C provided at the flow path 63A of the valve plunger 63 and the slit 61O in the valve holder 61 are communicated with one another, thereby connecting the regulator oil containing region 52 and the sensitive region 15, and in the case where the internal pressures of the regulator oil containing region 52 and the sensitive region 15 are different from each other, the pressures fluctuate so as to equalize those. On the other hand, when the columnar member is at a position other than the predetermined position, the coupling port 63C and the slit 61O are not communicated with one another, thereby cutting off the connection between the regulator oil containing region 52 and the sensitive region 15, so as not to make the pressures fluctuate. Then, because the above-described switching between a connection and a cutoff of the regulator oil containing region 52 and the sensitive region 15 is performed only by a movement of the valve sleeve 62 and the valve plunger 63 by the power unit 65, it is possible to easily perform a pressure regulation even in a high-temperature and high-pressure environment.

Further, the above-described valve mechanism 60 has the advantage in which the valve mechanism 60 can be driven with a low electric current as compared with a solenoid-controlled valve used for a pressure regulation in a high-pressure environment such as the bottom of water conventionally. Therefore, the valve mechanism 60 is suitably used for a device with limited power supply for the reason of being installed at the bottom of water for a long period, or the like. Further, the above-described valve mechanism 60 is capable of smoothly switching between a connection/a cutoff by inhibiting a moving speed of the valve sleeve 62 and the valve plunger 63, and is capable of reducing a fluctuation in pressure generated due to the valve at the time of operation of switching between a connection/a cutoff as compared with the solenoid valve. Therefore, the valve mechanism 60 can be preferably used for a device, such as the above-described strain gauge device 100, that gauges a minute change in pressure.

The embodiment of the present invention has been described above, and the above-described strain gauge device and the valve mechanism attached to the strain gauge device may be variously modified.

For example, with respect to the valve mechanism 60 included in the strain gauge device 100 of the above-described embodiment, the two members of the valve sleeve 62 and the valve plunger 63 are inserted into the inside of the valve holder 61. Meanwhile, the valve sleeve 62 and the valve plunger 63 may be integrated, and the valve mechanism 60 may be configured so as to switch between a connection and a cutoff of the regulator oil containing region 52 and the sensitive region 15 by driving the integrated member by the power unit 65.

Further, in the valve mechanism 60 in the strain gauge device 100 of the above-described embodiment, the configuration in which the valve plunger 63 moves to a position at which the coupling port 63C in the valve plunger 63 is not connected to the inside of the valve holder 61, thereby cutting off the regulator oil containing region 52 and the sensitive region 15 has been described. However, it is possible to achieve switching between a connection and a cutoff of the regulator oil containing region 52 and the sensitive region 15 with another configuration. For example, in a case of the configuration in which the coupling port 63C of the flow path provided at the valve plunger 63 and the opening in the valve holder 61 touch as in the above-described embodiment, the regulator oil containing region 52 and the sensitive region 15 are cut off in a case of the position at which those are not overlapped. In this way, for the valve mechanism 60 of the above-described embodiment, various configurations for achieving switching between a connection and a cutoff of the regulator oil containing region 52 and the sensitive region 15 can be utilized.

Further, in the above-described embodiment, the configuration in which the valve mechanism 60 is applied to the strain gauge device 100 has been described. However, the valve mechanism 60 can be applied to devices other than the strain gauge device 100. That is, the valve mechanism 60 of the above-described embodiment can be used for various devices for the purpose of switching between a connection and a cutoff of the two spaces. Further, the pressure balance mechanism 51 used for the strain gauge device 100 of the above-described embodiment can be applied to other underwater work devices. Further, the device may have a configuration in which the two spaces of the sensitive region 15 and the regulator oil containing region 52 to be switched between a connection/a cutoff thereof by the valve mechanism 60 may be filled with insulating oil whose coefficient of thermal expansion is small ($1 \times 10^{-4}$ or less) and whose viscosity is low (100 cps or less) such as mineral oil, alkyl benzene, polybutene, alkyl naphthalene, or alkyl diphenyl ethane in place of the silicon oil L, and further, the two spaces may be filled with various fluids in place of the silicon oil L which is liquid.

REFERENCE SIGNS LIST

1 . . . Ground, 2 . . . Vertical hole, 10 . . . Sensing unit, 11 . . . Inner tube, 13 . . . Outer tube (Container, Sensitive section), 15 . . . Sensitive region (Second space), 20 . . . Differential displacement gauge, 30 . . . Gauging unit, 50 . . . Pressure regulating unit, 51 . . . Pressure balance mechanism, 52 . . . Regulator oil containing region (First space), 53 . . . Housing part (Container, Outer tube part), 53A . . . Opening portion, 60... Valve mechanism, 61... Valve holder (Tubular member), 62 ... Valve sleeve (First member), 62C ... Projecting portion, 63 ... Valve plunger (Second member), 63A ... Flow path, 63B ... Opening, 63C ... Coupling port, 64 ... Valve screw, 65 ... Power unit, 66 ... Elastic member, 100 ... Strain gauge device.

The invention claimed is:

1. An underwater strain gauge device comprising:
   a container in which fluid is contained inside;
   an outer tube part which composes a part of the container, and has a tubular opening portion communicated with the outside; and
   a piston which is provided so as to block the opening portion inside the outer tube part, and is slidable in response to external pressure, and
   a gauging unit that gauges internal pressure of the container,
   wherein
   the container is composed of a sensitive section formed of a member deformable according to external pressure, and a volume of the inside of the container fluctuates by a deformation of the sensitive section.

2. The underwater strain gauge device according to claim 1 further comprising a displacement gauge that senses a displacement of the sensitive section.

3. The underwater strain gauge device according to claim 2, wherein a plurality of the displacement gauges are provided along the sensitive section.

4. The underwater strain gauge device according to claim 3, wherein
   a shape of the sensitive section is tubular, and
   the plurality of displacement gauges are respectively provided along an axial direction of the sensitive section.

5. The underwater strain gauge device according to claim 3, wherein
   the shape of the sensitive section is tubular, and
   the plurality of displacement gauges are respectively provided along a circumference of a plane perpendicular to an axis of the sensitive section.

6. The underwater strain gauge device according to claim 5, wherein
   the plurality of displacement gauges are respectively provided along the circumference of the plane so as to be disposed symmetrically to the center of the plane.

7. The underwater strain gauge device according to claim 3, wherein
   the shape of the sensitive section is tubular, and
   the plurality of displacement gauges are respectively provided so as to be spiral along the axis direction of the sensitive section.

8. The underwater strain gauge device according to claim 1, wherein
   the inside of the container is partitioned into a first space and a second space,
   the outer tube part and the piston are provided to the first space,
   the sensitive section is provided to the second space,
   the gauging unit gauges internal pressure of the second space in the container, and
   a valve mechanism that switches between a connection and a cutoff of the first space and the second space is further included.

9. The underwater strain gauge device according to claim 8, wherein
   the valve mechanism includes a tubular member, a columnar member which is provided so as to be movable in a direction of axis of the tubular member inside of the tubular member, and a power unit that moves the columnar member,
   the tubular member has an opening in a side surface of the tubular member for connecting the inside of the tubular member and the second space,
   the columnar member has a flow path whose one end is connected to the first space and the other end is regarded as a coupling port provided to a side surface of the columnar member, and
   the coupling port is communicated with the opening when the columnar member is at a predetermined position in the inside of the tubular member, and is not communicated with the opening when the columnar member is at a position other than the predetermined position in the inside of the tubular member.

10. The underwater strain gauge device according to claim 2, wherein
    the inside of the container is partitioned into a first space and a second space,
    the outer tube part and the piston are provided to the first space,
    the sensitive section is provided to the second space,
    the gauging unit gauges internal pressure of the second space in the container, and
    a valve mechanism that switches between a connection and a cutoff of the first space and the second space is further included.

11. The underwater strain gauge device according to claim 2, wherein
    the inside of the container is partitioned into a first space and a second space,
    the outer tube part and the piston are provided to the first space,
    the sensitive section is provided to the second space,
    the gauging unit gauges internal pressure of the second space in the container, and
    a valve mechanism that switches between a connection and a cutoff of the first space and the second space is further included.

12. The underwater strain gauge device according to claim 4, wherein
    the inside of the container is partitioned into a first space and a second space,
    the outer tube part and the piston are provided to the first space,
    the sensitive section is provided to the second space,
    the gauging unit gauges internal pressure of the second space in the container, and
    a valve mechanism that switches between a connection and a cutoff of the first space and the second space is further included.

13. The underwater strain gauge device according to claim 5, wherein
    the inside of the container is partitioned into a first space and a second space,
    the outer tube part and the piston are provided to the first space,
    the sensitive section is provided to the second space,
    the gauging unit gauges internal pressure of the second space in the container, and
    a valve mechanism that switches between a connection and a cutoff of the first space and the second space is further included.

14. The underwater strain gauge device according to claim 6, wherein the inside of the container is partitioned into a first space and a second space, the outer tube part and the piston are provided to the first space, the sensitive section is provided to the second space, the gauging unit gauges internal pressure of the second space in the container, and a valve mechanism that switches between a connection and a cutoff of the first space and the second space is further included.

15. The underwater strain gauge device according to claim 10, wherein the valve mechanism includes a tubular member, a columnar member which is provided so as to be movable in a direction of axis of the tubular member inside of the tubular member, and a power unit that moves the columnar member, the tubular member has an opening in a side surface of the tubular member for connecting the inside of the tubular member and the second space, the columnar member has a flow path whose one end is connected to the first space and the other end is regarded as a coupling port provided to a side surface of the columnar member, and the coupling port is communicated with the opening when the columnar member is at a predetermined position in the inside of the tubular member, and is not communicated with the opening when the columnar member is at a position other than the predetermined position in the inside of the tubular member.

16. The underwater strain gauge device according to claim 11, wherein the valve mechanism includes a tubular member, a columnar member which is provided so as to be movable in a direction of axis of the tubular member inside of the tubular member, and a power unit that moves the columnar member, the tubular member has an opening in a side surface of the tubular member for connecting the inside of the tubular member and the second space, the columnar member has a flow path whose one end is connected to the first space and the other end is regarded as a coupling port provided to a side surface of the columnar member, and the coupling port is communicated with the opening when the columnar member is at a predetermined position in the inside of the tubular member, and is not communicated with the opening when the columnar member is at a position other than the predetermined position in the inside of the tubular member.

17. The underwater strain gauge device according to claim 12, wherein the valve mechanism includes a tubular member, a columnar member which is provided so as to be movable in a direction of axis of the tubular member inside of the tubular member, and a power unit that moves the columnar member, the tubular member has an opening in a side surface of the tubular member for connecting the inside of the tubular member and the second space, the columnar member has a flow path whose one end is connected to the first space and the other end is regarded as a coupling port provided to a side surface of the columnar member, and the coupling port is communicated with the opening when the columnar member is at a predetermined position in the inside of the tubular member, and is not communicated with the opening when the columnar member is at a position other than the predetermined position in the inside of the tubular member.

18. The underwater strain gauge device according to claim 13, wherein the valve mechanism includes a tubular member, a columnar member which is provided so as to be movable in a direction of axis of the tubular member inside of the tubular member, and a power unit that moves the columnar member, the tubular member has an opening in a side surface of the tubular member for connecting the inside of the tubular member and the second space, the columnar member has a flow path whose one end is connected to the first space and the other end is regarded as a coupling port provided to a side surface of the columnar member, and the coupling port is communicated with the opening when the columnar member is at a predetermined position in the inside of the tubular member, and is not communicated with the opening when the columnar member is at a position other than the predetermined position in the inside of the tubular member.

19. The underwater strain gauge device according to claim 14, wherein the valve mechanism includes a tubular member, a columnar member which is provided so as to be movable in a direction of axis of the tubular member inside of the tubular member, and a power unit that moves the columnar member, the tubular member has an opening in a side surface of the tubular member for connecting the inside of the tubular member and the second space, the columnar member has a flow path whose one end is connected to the first space and the other end is regarded as a coupling port provided to a side surface of the columnar member, and the coupling port is communicated with the opening when the columnar member is at a predetermined position in the inside of the tubular member, and is not communicated with the opening when the columnar member is at a position other than the predetermined position in the inside of the tubular member.

* * * * *